United States Patent Office 3,657,157
Patented Apr. 18, 1972

3,657,157
RANEY NICKEL ACTIVATION USING ACID NEUTRALIZATION AND PRODUCT
William Johan Meindert Pieters, Denville, N.J., John Freel, Oakmont, Pa., and Robert Bernard Anderson, Ancaster, Ontario, Canada, assignors to W. R. Grace & Co., New York, N.Y.
No Drawing. Filed Oct. 21, 1970, Ser. No. 82,833
Int. Cl. B01j 11/22
U.S. Cl. 252—466
3 Claims

ABSTRACT OF THE DISCLOSURE

Raney nickel-aluminum alloys are leached with alkali. The leach solution is immediately neutralized by means of titration with an organic acid such as lactic acid. The solution pH is adjusted to between 7.2 and 8.0. The catalyst is removed from the solution and washed with absolute ethanol. The novel Raney nickel catalyst has an increased activity over known Raney nickel catalysts, and was produced in a much shorter time than are known Raney nickel catalysts.

BACKGROUND OF THE INVENTION

This invention relates to a process for producing a Raney nickel catalyst. The process of the present invention produces a Raney nickel catalyst in a shorter time and one which has an increased activity. Further, the catalyst may be easily handled. Raney nickel catalysts are mainly useful in hydrogenation reactions, but they may also be used in certain dehydrogenation, dehalogenation and desulfurization reactions.

After a Raney nickel-aluminum alloy is leached with alkali, the alkali is washed from the catalyst. The water washing usually requires 4 hours, and this prolonged exposure of the catalyst to hot water has an adverse effect on the catalyst activity. Washing with ethanol, instead of water, usually takes 4 to 6 hours. Prior art replacements of the washings with a simple acid titration have not been successful. It is known that inorganic and organic acids are poisonous to the catalyst.

Pertinent prior art include U.S. Pats. 3,139,408 and 2,983,734.

U.S. Pat. No. 3,139,408 discloses a process for preparing a Raney nickel catalyst which includes: (a) digesting a Raney nickel-aluminum alloy in alkali; (b) washing the digested product free from alkali with water; (c) treating the digested and washed product of step (b) in suspension first with a reagent that is a proton acceptor and subsequently with a reagent that is a proton donor; and (d) washing the treated product of step (c) free from the treating reagents with water. U.S. Pat. No. 2,983,734, discloses activating the Raney nickel catalyst then after it has been removed from the alkali leaching solution, washing it with phosphoric acid or sulfuric acid. The present process by directly neutralizing the leach solution with an organic acid such as lactic acid advances the art by decreasing the production time while increasing the activity.

SUMMARY OF THE INVENTION

This invention involves a process for preparing and activating a porous, finely-divided catalyst. The alloy consisting essentially of nickel and aluminum is prepared and physically reduced to a finely-divided state. Aluminum is chemically partially dissolved (leaching) from the alloy by means of a basic solution to form a porous finely-divided catalyst which contains at least 2 weight percent aluminum, a minor portion of chemically-bonded oxygen and the remainder nickel. The leaching solution is then immediately neutralized with an organic acid to a pH between 6.5 and 7.1. The pH of the solution is then adjusted to a level from about 7.2 to about 8.0. The catalyst is removed from the solution. The catalyst is washed with absolute ethanol and the activated nickel catalyst recovered.

The catalysts of this invention have activities of several times the activity of Raney nickel catalysts prepared by conventional methods. The time necessary to produce the catalysts is greatly decreased.

The catalysts of this invention may be employed in the hydrogenation of carbonyl-containing organic compounds to the corresponding hydroxy-containing compounds. They may also be employed in the hydrogenation of compounds containing aromatic unsaturation to form cycloaliphatic compounds, nitro groups to amino groups, or olefinic compounds to saturated compounds. The catalysts also may be advantageously employed in certain dehydrogenation, dehalogenation and desulfurization reactions.

DETAILED DESCRIPTION OF THE INVENTION

The Raney nickel-aluminum alloy can be prepared by any method known to the art. The alloy from which the catalyst is prepared can contain from 30 to 60 weight percent nickel and from 40 to 70 weight percent aluminum. Example 1 gives a method of preparing the alloy. The catalyst activated by the method of this invention contains from 80 to 96 weight percent nickel, from 2 to 12 weight percent aluminum, and the remainder is essentially chemically-bonded oxygen.

Bases which can be used to partially leach or chemically dissolve the aluminum from the alloy include sodium hydroxide, potassium hydroxide, sodium carbonate, calcium carbonate, tetramethyl ammonium hydroxide, etc.

After the aluminum is partially leached or chemically dissolved out of the alloy, the alkali or basic admixture is neutralized by means of an organic acid. The organic acid must not have a high degree of reactivity with the Raney material. As used herein, the term neutralizing means to achieve a solution pH between about 6.5 and 7.1. The preferred organic acid is lactic acid (possibly because aluminum lactate is very soluble in water solutions). Other useful organic acids include: saturated mono-carboxylic aliphatic acids, e.g., formic acid, acetic acid, propionic acid, butyric acid, isobutyric acid, valeric acid, isovaleric acid, caproic acid, enanthic acid, caprylic acid, hydroxy-substituted aliphatic acids, e.g., glycolic acid, β-hydroxybutyric acid, gluconic acid, tartronic acid, malic tartaric acid, saccharic acid, citric acid, etc.; saturated dicarboxylic aliphatic acids, e.g., oxalic acid, maloric acid, succinic acid, glutaric acid, adipic acid, pimelic acid, etc.; saturated tricarboxylic aliphatic acids, e.g., tricarballylic acid, etc.; and alicyclic acids, e.g., cyclopentanecarboxylic acid; hexahydrobenzoic acid, hexahydrophthalic acid, etc. The useful organic acids must be at least partially soluble in water.

After the neutralization step, the pH of the solution is immediately adjusted to a level between about 7.2 and about 8.0, using any of the bases which are listed above as used for leaching the alloy. The catalyst is removed from the solution and is washed with a dried alcohol, preferably absolute thanol. Absolute ethanol is a dehydrated ethanol containing at least 99 percent by weight ethanol. Useful dry alcohols include the alkanols, e.g., the primary saturated aliphatic alcohols such as methanol, ethanol, propanol, 1-butanol, amyl alcohol, hexyl alcohol, heptyl alcohol, octyl alcohol, nonyl alcohol, decyl alcohol, dodecyl alcohol, tetradecyl alcohol, cetyl alcohol, octadecyl alcohol, isobutyl alcohol, 1-undecanol, 1-tridecanol, 1-peritadecanol, 1-heptadecanol, 1- nondecanol, 1-duodecanol, 8-hexadecenyl-1 ol, etc., the secondary saturated aliphatic alcohols such as secbutyl alcohol, 2-octanol, etc., and the tertiary saturated aliphatic alcohols such as t-butyl alcohol, etc.; the aromatic alcohols such as cyclohexanol, etc.; and the heterocyclic alcohols such as furfuryl alcohol, etc.

The activities in this application were determined for the hydrogenation of cyclohexene in ethanol at 30° C. with the hydrogen pressure maintained at atmospheric pressure in a stirred micro-reactor. The reactor contained 5 cc. ethanol and about 40 mg. catalyst, and 0.1 cc. of cyclohexene was used. The hydrogenation was followed by measuring the uptake of hydrogen. Activities are based on the slope of the hydrogen consumption time curve at a conversion of 50 weight percent of the cyclohexene, divided by the weight of catalyst, but are reported here on a relative basis.

Weight percent or percent by weight as used throughout this application, unless otherwise specifically stated, is defined conventionally as grams per hundred grams of total composition (dry basis).

The following examples illustrate this invention. All percentages and parts therein are by weight, unless otherwise stated.

Example 1

A nickel-aluminum alloy was prepared by adding 200 gm. of aluminum shot and 200 gm. of nickel shot to a graphite crucible. The optimum aluminum and nickel shot diameter was about ¼"; shot less than ¼" was difficult to stir, and shot greater than ¼" resulted in a very large exotherm. The crucible was placed in a furnace at about 1100° C. Cooling caused by the crucible, as well as heat loss caused by opening the furnace door, lowered the temperature to about 1000° C. The crucible was removed from the furnace after about 15 minutes, at which time the furnace temperature was 1075–1100° C. Immediately after removal from the furnace, the crucible contents were stirred with a carbon rod; no attempt was made to preheat the rod before stirring. After vigorous stirring for 30 seconds, the contents gradually turned red, and then metal solution took place, resulting in a white hot melt. The melt was stirred for an additional 15 seconds. The molten alloy was cooled by pouring it into a depression in refractory grade sand. The resultant alloy contained about 50 weight percent Al and about 50 weight percent Ni.

The nickel-aluminum alloy was easily crushed to jagged, irregularly shaped pieces about ¼" x ¼" in a jaw crusher. The pieces are then reduced to a fine powder (−200 mesh, U.S. Sieve Series), using a ball mill with ½" steel balls.

Example 2

5 gm. of the Raney nickel-aluminum alloy of Example 1 was placed in 200 cc. of water at 50° C. Aqueous NaOH (40%) was added with stirring as stated below. The system was sealed and the hydrogen evolved was measured with a wet test meter. By adding 15 cc. of alkali initially and 10 cc. at 5 minute intervals, hydrogen evolution corresponding to 80 percent oxidation of aluminum was obtained in 20–30 minutes, and the temperature of the reaction mixture had increased to about 75° C. in the equipment used. At this point, the reaction mixture was neutralized (by titration) with an aqueous solution of lactic acid, cooled in ice to about 0° C. and the pH adjusted to 7.5 with NaOH using a pH meter. The catalyst was then washed with 1 liter of absolute ethanol. The catalyst had an activity of 600. The total time required for preparation of a catalyst by the acid neutralization method was 75 minutes.

Example 3

Example 2 was repeated, except that the washing was done with water instead of absolute ethanol. The catalyst had an activity of 250.

Example 4

Example 2 was repeated, except that the lactic acid was replaced with acetic acid. An activated catalyst was obtained.

Example 5

Example 2 was repeated, except that the lactic acid was replaced with formic acid. An activated catalyst was obtained.

Example 6

Example 2 was repeated, except that the lactic acid was replaced with tartaric acid. An activated catalyst was obtained.

Example 7

Example 2 was repeated, except that the sodium hydroxide used for leaching was replaced with sodium carbonate. An activated catalyst was obtained.

Example 8

Example 2 was repeated, except that the sodium hydroxide used for leaching was replaced with potassium hydroxide. An activated catalyst was obtained.

Example 9

Example 2 was repeated, except that the sodium hydroxide used to raise the pH to 7.5 was replaced with potassium hydroxide. An activated catalyst was obtained.

As used in this application, dried alcohol means an alcohol having up to about a 4–7 percent water content. Absolute ethanol is an ethanol having a 1 percent or less water content.

What is claimed is:

1. A process for preparing and activating a porous, finely-divided catalyst which comprises:
    (a) preparing an alloy consisting essentially of nickel and aluminum;
    (b) physically reducing said alloy to a finely-divided state;
    (c) chemically partially dissolving said aluminum from said alloy with a basic solution to form a porous finely divided catalyst which comprises at least 2 weight percent aluminum, a minor portion of chemically-bonded oxygen and the remainder nickel;
    (d) neutralizing this admixture with an organic acid to a pH between 6.5 and 7.1;
    (e) immediately adjusting the pH of the admixture to between about 7.2 and about 8.0;
    (f) removing said catalyst from said admixture;
    (g) washing said catalyst with a dried alcohol; and
    (h) recovering said catalyst containing activated nickel.

2. A process as defined in claim 1 wherein the organic acid is lactic acid.

3. A process as described in claim 1 wherein said dried alcohol is absolute ethanol.

References Cited

UNITED STATES PATENTS 3,139,408   6/1964   Tumer _____ 252—466

DANIEL E. WYMAN, Primary Examiner

P. M. FRENCH, Assistant Examiner

U.S. Cl. X.R.

252—477 Q